United States Patent [19]

Chen

[11] Patent Number: 5,609,092
[45] Date of Patent: Mar. 11, 1997

[54] TEAPOT WITH AN ADJUSTABLE TEA INFUSER

[76] Inventor: Chien-Chou Chen, No. 340, Fu Lien Road, Tainan, Taiwan

[21] Appl. No.: 670,218

[22] Filed: Jun. 21, 1996

[51] Int. Cl.⁶ .................................................. A47J 31/18
[52] U.S. Cl. ............................................ 99/319; 99/322
[58] Field of Search ................................. 99/279, 289 R, 99/295, 317, 318, 319, 320, 321, 322; 426/433

[56] References Cited

U.S. PATENT DOCUMENTS

| | | | |
|---|---|---|---|
| 1,123,467 | 1/1915 | Bauer | 99/319 |
| 2,109,363 | 2/1938 | Williams | 99/319 |
| 2,560,214 | 7/1951 | Cameron | 99/319 |
| 4,365,544 | 12/1982 | Howitt | 99/319 |
| 4,401,014 | 8/1983 | McGrail | 99/320 |

*Primary Examiner*—Robert W. Jenkins
*Attorney, Agent, or Firm*—Bacon & Thomas

[57] ABSTRACT

A teapot with an adjustable tea infuser includes a container having a bottom with a front plate, a rear plate and two side plates extending from four sides of the bottom so as to define an open top, a handle disposed to the rear plate and extending from an upper edge of the rear plate, the handle having at least one notch defined therein, a cover mounted to the container and engaged with the open top, a gap defined between the cover and the handle when the cover mounted to the container, a flexible plate having a first end with a positioning device connected thereto and a second end connected to a tea infuser such that the tea infuser is positioned by adjusting the flexible plate which extends through the gap into the container, and engaging the positioning device with the notch.

4 Claims, 7 Drawing Sheets

5,609,092

TEAPOT WITH AN ADJUSTABLE TEA INFUSER

BACKGROUND OF THE INVENTION

1. Field of the Invention

The present invention relates to a teapot and more particularly, to a teapot with an adjustable tea infuser which can be positioned at a desired depth in the teapot.

2. Brief Description of the Prior Art

FIG. 1 shows a conventional teapot with a tea infuser therein. The teapot generally has a body 70 having a certain depth, a handle 71 disposed to an outer periphery of the body 70 and a cover 72 which has a threaded recess 721 defined in an under side thereof so as to threadedly engage a tea infuser 73 therewith, the tea infuser 73 having a plurality of holes 731 defined therein such that tea leaves 74 can be disposed in the tea infuser 73 and are infused by hot water in the body 70. However, because the tea infuser 73 is connected on the cover 72 such that when the hot water in the body 70 is used and a water level of the hot water is lower than the position of the tea infuser 73, the tea made by the tea leaves 74 with be unsatisfied. Therefore, a user must add hot water all the time during making tea.

The present invention intends to provide an improved teapot which has a tea infuser movably disposed therein such that the tea infuser can always infused in water within the teapot so as to mitigate and/or obviate the above-mentioned problems.

SUMMARY OF THE INVENTION

The present invention provides a teapot with an adjustable tea infuser, which includes a container having a bottom with a front plate, a rear plate and two side plates respectively extending from four sides of the bottom so as to define an open top. A handle is disposed to the rear plate and extends from an upper edge of the rear plate, the handle having at least one notch defined therein. A cover can be mounted to the container and engaged with the open top so as to define a gap defined between the cover and the handle. A flexible plate has a first end with a positioning means connected thereto and a second end connected to a tea infuser such that the tea infuser is positioned by adjusting the flexible plate which extends through the gap into the container, and engaging the positioning means with the notch.

It is an object of the present invention to provide a teapot with a tea infuser which can be positioned within the teapot.

It is another object of the present invention to provide a teapot having a flexible plate with one end thereof inserted into the teapot and the other end of the flexible plate positioned to the handle.

Other objects, advantages, and novel features of the invention will become more apparent from the following detailed description when taken in conjunction with the accompanying drawings.

Figure 1:
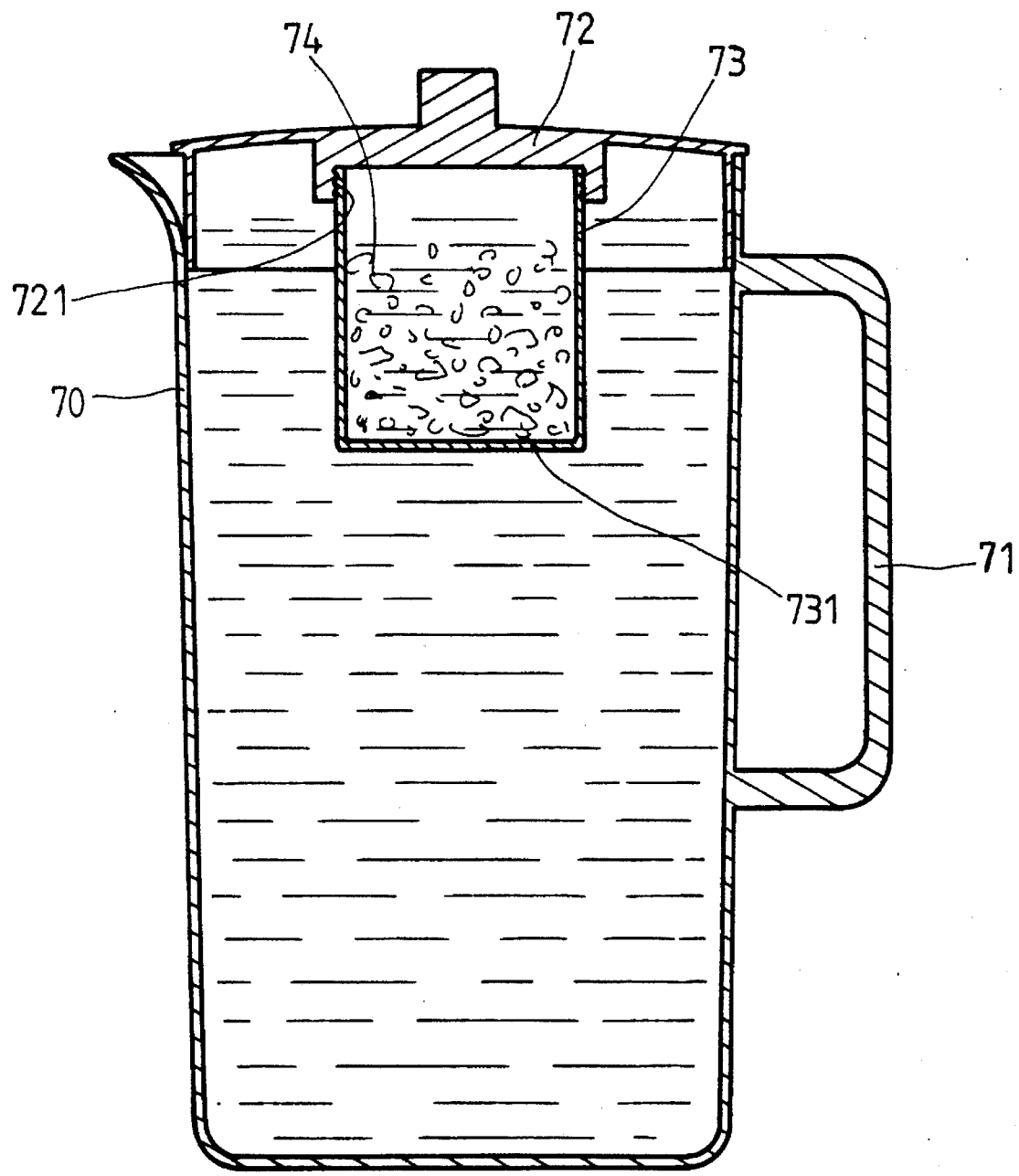
FIG. 1 is a side elevational view, partly in section, of a conventional teapot with a tea infuser disposed thereon.
Figure 2:
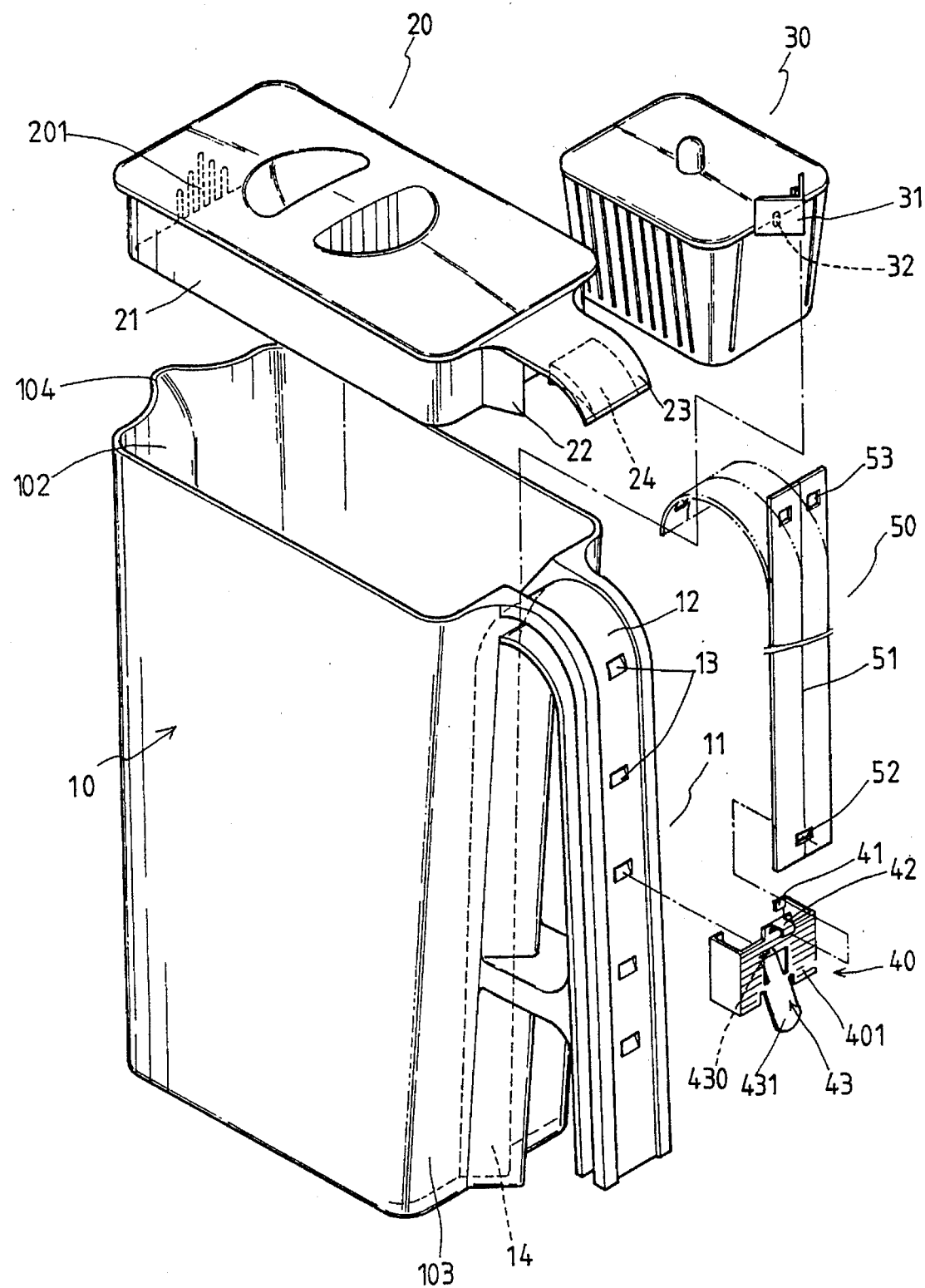
FIG. 2 is an exploded view of a teapot with an adjustable tea infuser in accordance with the present invention.
Figure 3:
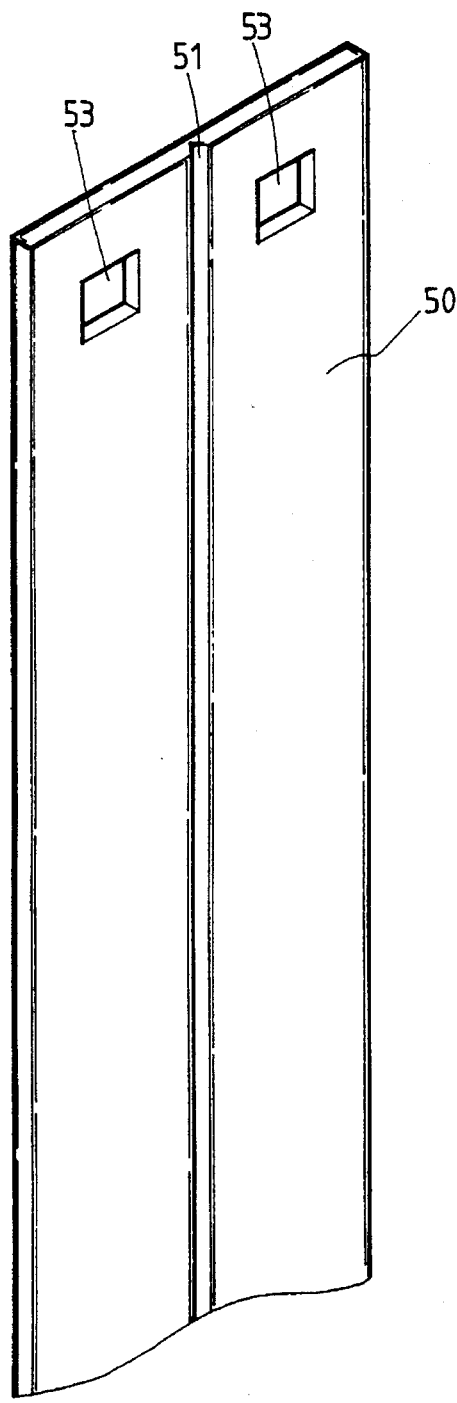
FIG. 3 is a perspective view of a section of a flexible plate in accordance with the present invention.
Figure 4:
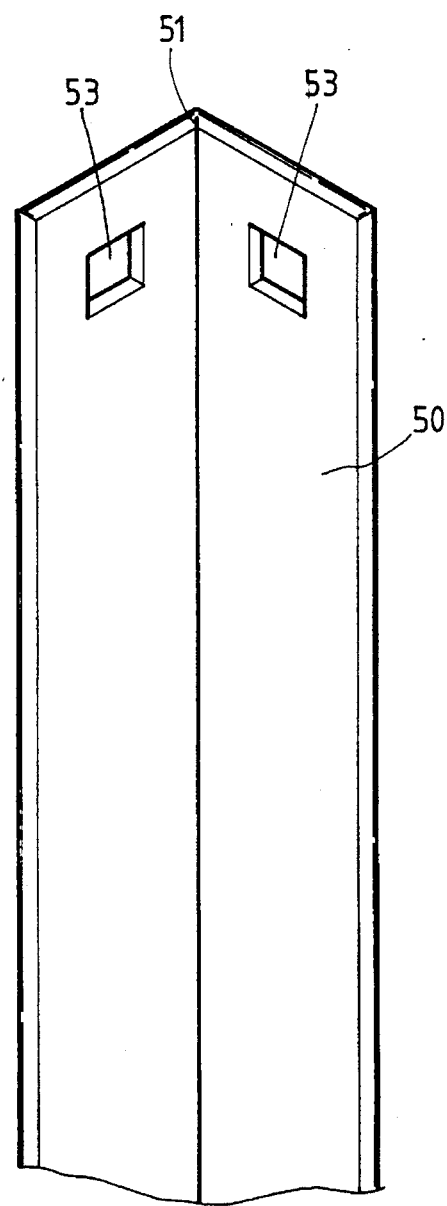
FIG. 4 is a perspective view of a section of a flexible plate when folded along a central groove thereof in accordance with the present invention.
Figure 5:
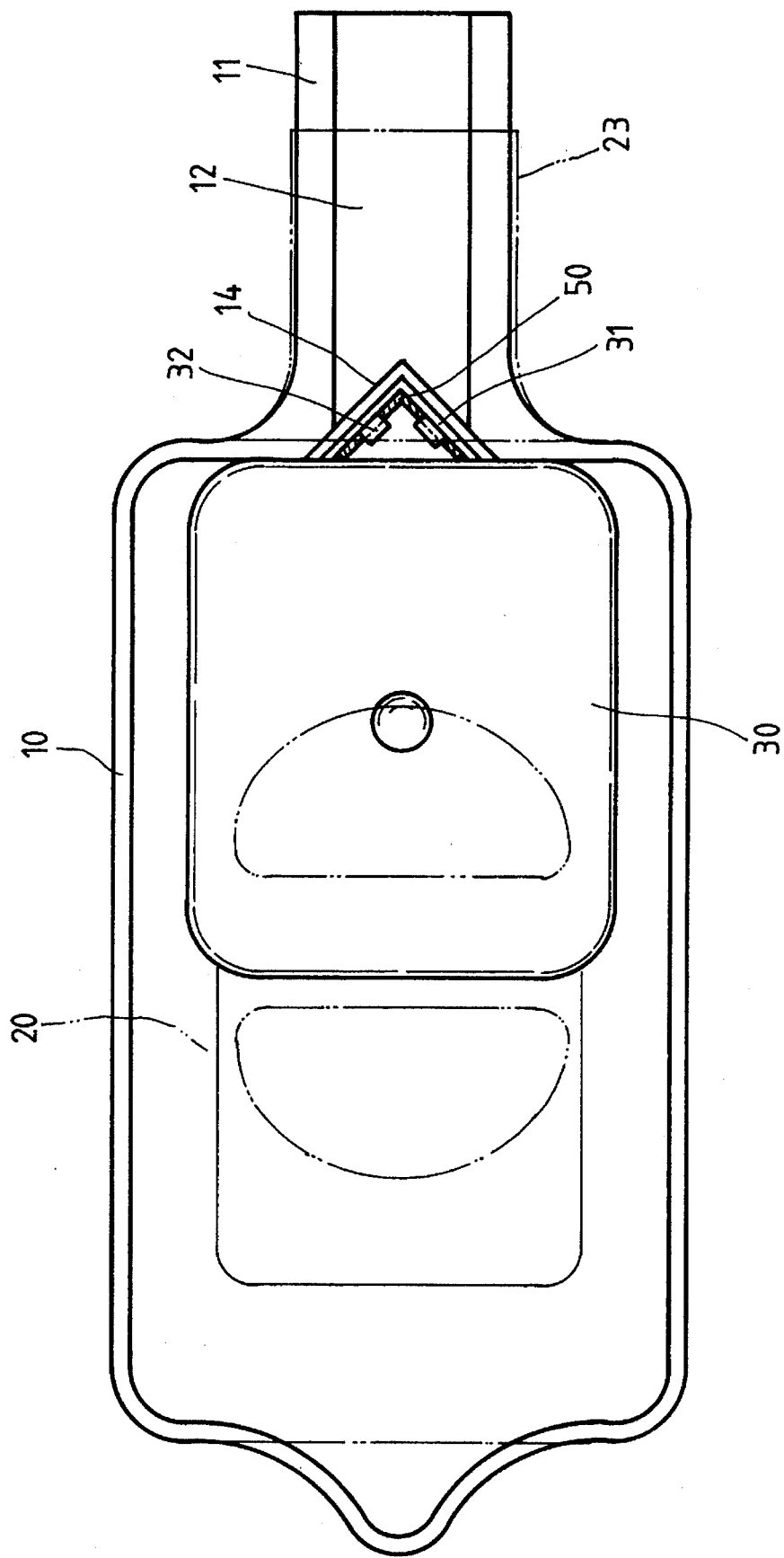
FIG. 5 is a top plan view, partly in section, of the arrangement between the tea infuser, the flexible plate, the handle and the cover of the teapot.
Figure 6:
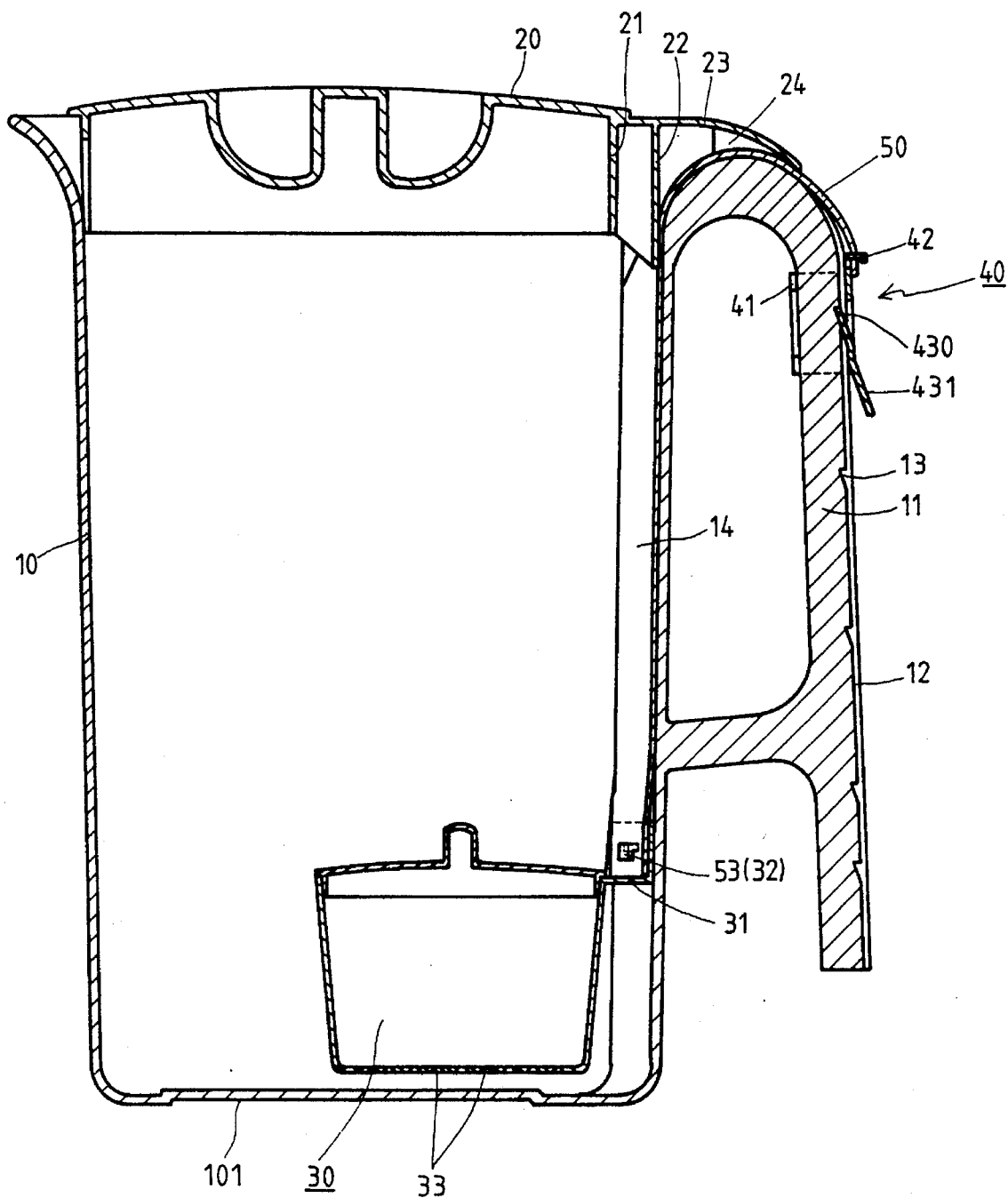
FIG. 6 is a side elevational view, partly in section, of the teapot wherein the tea infuser is located on the bottom of the container.

DETAILED DESCRIPTION OF THE PREFERRED EMBODIMENTS.

Referring to the drawings and initially to FIGS. 2 through 6, a teapot with an adjustable tea infuser in accordance with the present invention generally includes a container 10 having a bottom 101 (see FIG. 6) with a front plate 102, a rear plate 103 and two side plates extending from four sides of the bottom 101 so as to define an open top. A pouring lip 104 is defined in an upper edge of the front plate 102. A handle 11 is disposed to an outer surface of the rear plate 103 and extends from an upper edge of the rear plate 103. The handle has a recessed way 12 defined along an outer periphery thereof and a plurality of notches 13 are defined in a bottom defining the recessed way 12. A V-shaped groove 14 defined in an inner surface of the rear plate 103 and the V-shaped groove 14 extends to communicate the recessed way 12.

A cover 20 is mounted to the container 10 and is engaged with the open top such that a gap is defined between the cover 20 and the handle 11 when the cover 20 is mounted to the container 10.

A flexible plate 50 has a first end and a second end and a central groove 51 is defined longitudinally therein, the first end thereof having a positioning means 40 connected thereto and the second end of the flexible plate 50 connected to a tea infuser 30 such that the flexible plate 50 is received in the recessed ay 12 and extends into the container via the gap.

The second end of the flexible plate 50 has two apertures 53 defined therein and the tea infuser 30 has a V-shaped frame 31 disposed thereto which has two hooks 32 formed thereto so as to engage with the two apertures 53. The first end of the flexible plate 50 has a slot 52 defined therein so as to engage with the positioning means 40. The positioning means 40 is a U-shaped member which has a first board 401 and each one of two sides of the first board 401 has an arm 402 extending therefrom, each of the two arms 402 having a protrusion 41 extending transversely from a distal end thereof so as to clamp the handle 11 by clamping the two arms 402 to the handle 11. The first board 401 has a trigger 43 extending therethrough and is pivotally disposed thereto which has an end 430 extending through the first board 401 and being engaged with the notch 13 of the handle 11. A tongue 42 extends from an upper edge of the first board 401 so as to be engaged with the slot 52 of the flexible plate 50.

The cover 20 has a inserting skirt 21 extending from four sides thereof so as To be engaged with the open top of the container 10. The inserting skirt 21 has a plurality of cut-outs 201 defined in a front portion thereof and an extending portion 23 extending from a rear edge of the cover 20 such that when the cover 20 is mounted to the container 10, the extending portion 23 is mounted onto an upper portion of the handle 11, A curved block 24 extending from an under side of the extending portion 23 so as to be receive in the recessed way 12 to limit the flexible plate 50. A V-shaped portion 22 extending from a rear portion of the inserting skirt 21 such that when the cover 20 is mounted to the container 10, the V-shaped portion 22 is received in the V-shaped groove 14 so as to fold the flexible plate 50 along the central groove 51 into a V-shaped configuration.

Figure 7:
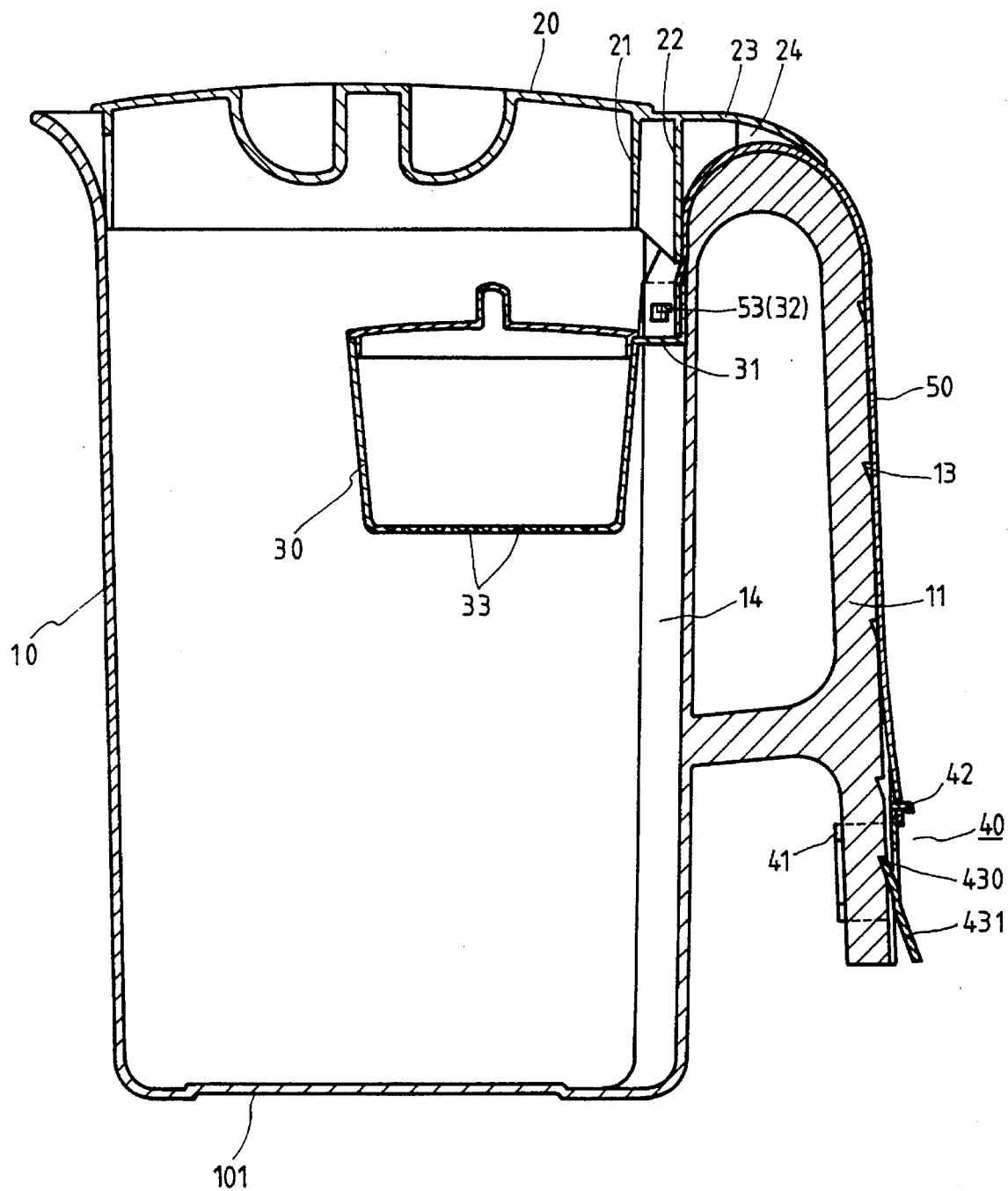
FIG. 7 is a side elevational view, partly in section, of the teapot wherein the tea infuser is located at a higher position in the container.

Accordingly, the tea infuser 30 is positioned by adjusting the flexible plate 50 and engaging the end 430 of the trigger 43 with one of the notches 13. Referring to FIG. 7, when pushing the other end 431 of the trigger 53 to disengage the end 430 front the notch 13, the flexible plate 50 can be moved to a desired position where the end 430 is engaged with the notch 13 corresponding thereto.

Figure 8:
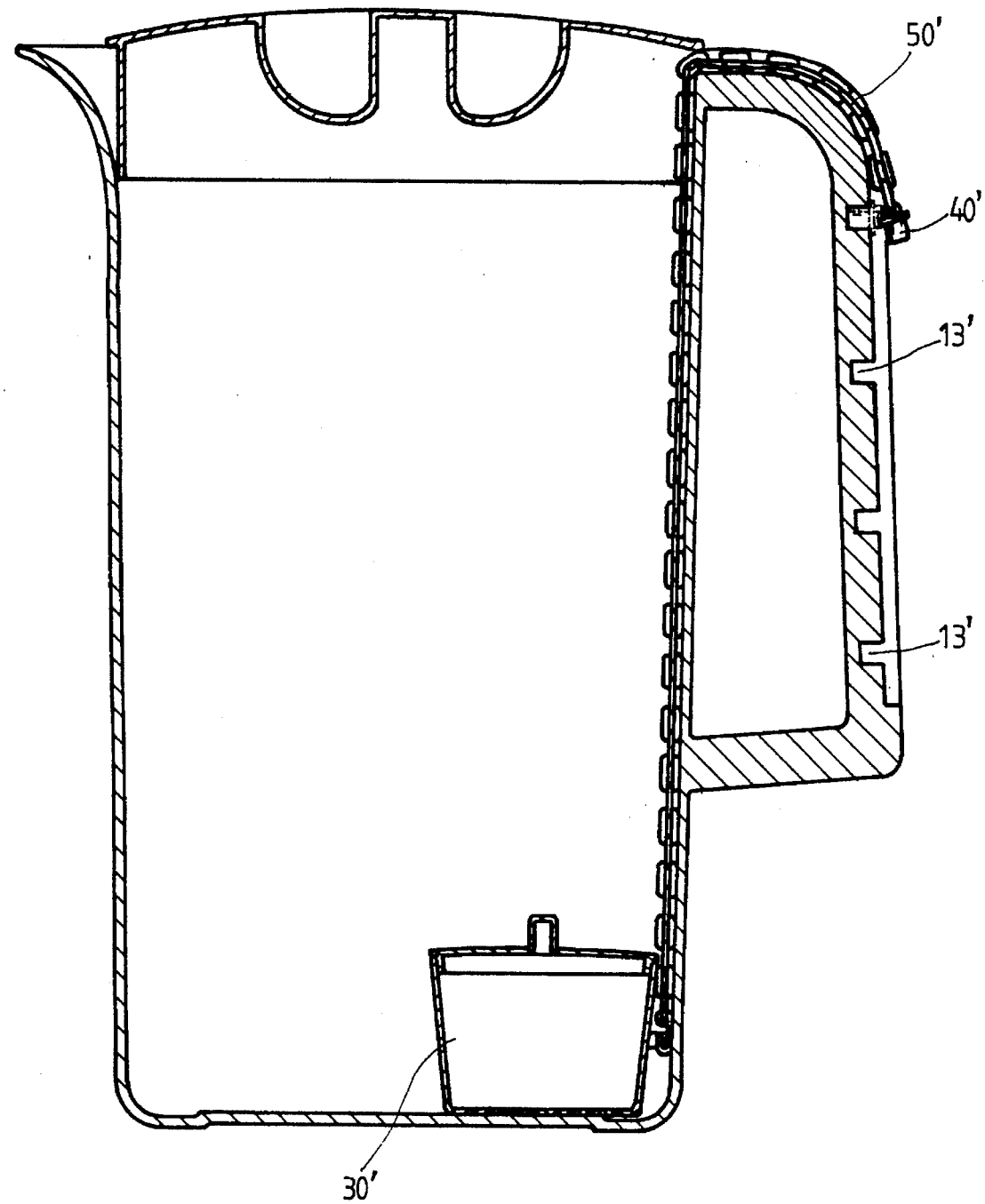
FIG. 8 is a side elevational view, partly in section, of another embodiment of the teapot.

Referring to FIG. 8, the flexible plate can be a chain 50' which has a first end having a block 40' for being inserted into the notch 13' corresponding thereto and a second connected to a tea infuser 30'.

Although the invention has been explained in relation to its preferred embodiment,. it is to be understood that many other possible modifications and variations can be made without departing from the spirit and scope of the invention as hereinafter claimed.

What is claimed is:

1. A teapot with an adjustable tea infuser and comprising:
   a container having a bottom with a front plate, a rear plate and two side plates respectively extending from four sides of said bottom so as to define an open top, a handle disposed to an outer surface of said rear plate and extending from an upper edge of said rear plate, said handle having at least one notch defined therein;
   a cover mounted to said container and engaged with said open top, a gap defined between said cover and said handle when said cover is mounted to said container, and
   a flexible plate having a first end and a second end, said first end thereof having a positioning means connected thereto and said second end of said flexible plate connected to a tea infuser such that said flexible plate extends into said container via said gap and said tea infuser is positioned by adjusting said flexible plate and engaging said positioning means with said notch.

2. The teapot as claimed in claim 1 wherein said handle has a recessed way defined along an outer periphery thereof and said notch is defined in a bottom defining said recessed way.

3. The teapot as claimed in claim 1 wherein said second end of said flexible plate has two apertures defined therein and said tea infuser has a frame disposed thereto, said frame having two hooks formed thereto so as to engage with said two apertures.

4. The teapot as claimed in claim 1 wherein said positioning means is a U-shaped member which has a first board and each one of two sides of said first board has an arm extending therefrom so as to clamp said handle, said first board having a trigger extending therethrough and pivotally disposed to said first board, said trigger having an end engaged with said notch of said handle.

* * * * *